United States Patent [19]

Ratcliff et al.

[11] Patent Number: 4,949,672
[45] Date of Patent: Aug. 21, 1990

[54] BORON-BASED ODOR CONTROL ANIMAL LITTER

[75] Inventors: Steven D. Ratcliff, Antioch; Randy L. Wood, San Ramon; Donald K. Swatling, El Cerrito; Peter C. Arbogast, Pleasanton, all of Calif.

[73] Assignee: The Clorox Company, Oakland, Calif.

[21] Appl. No.: 208,953

[22] Filed: Jun. 17, 1988

[51] Int. Cl.$^5$ ............................................. A01K 1/015
[52] U.S. Cl. .................................................... 119/1
[58] Field of Search ............................. 119/1; 502/84

[56] References Cited

U.S. PATENT DOCUMENTS

| | | | |
|---|---|---|---|
| 2,895,873 | 7/1959 | Sawyer et al. | 167/42 |
| 3,029,783 | 4/1962 | Sawyer et al. | 119/1 |
| 3,059,615 | 10/1962 | Kuceski et al. | 119/1 |
| 3,352,792 | 11/1967 | Clark et al. | 252/193 |
| 3,388,989 | 6/1968 | Sor | 71/28 |
| 3,523,018 | 8/1970 | Geissler et al. | 71/28 |
| 3,565,599 | 2/1971 | Sor et al. | 71/28 |
| 3,765,371 | 10/1973 | Fisher | 119/1 |
| 3,883,303 | 5/1975 | Roberts | 21/55 |
| 3,892,846 | 7/1975 | Wortham | 424/76 |
| 3,923,005 | 12/1975 | Fry | 119/1 |
| 4,054,518 | 10/1977 | Gould | 210/61 |
| 4,217,858 | 8/1980 | Dantoni | 119/1 |
| 4,263,873 | 4/1981 | Christianson | 119/1 |
| 4,306,516 | 12/1981 | Currey | 119/1 |
| 4,369,199 | 1/1983 | Katzen | 426/641 |
| 4,407,231 | 10/1983 | Colborn | 119/1 |
| 4,462,819 | 7/1984 | Ven der Puy | 71/28 |
| 4,494,481 | 1/1985 | Rodriguez et al. | 119/1 |
| 4,622,920 | 11/1986 | Goss | 119/1 |
| 4,628,863 | 12/1986 | Eichenauer | 119/1 |
| 4,641,605 | 2/1987 | Gordon | 119/1 |

FOREIGN PATENT DOCUMENTS 50-05538  1/1975  Japan .

OTHER PUBLICATIONS

Kirk–Othmer, Encyclopedia of Chemical Technology, 3rd Ed., vol. 4, pp. 67–109 (1978).
J. M. Brenner et al., "Urease Activities in Soils", in: Soil Enzymes, p. 181 (1978).
Cotton et al., Advanced Organic Chemistry, 4th Ed., pp. 269–299 (1980).

Primary Examiner—Robert P. Swiatek
Attorney, Agent, or Firm—Joel J. Hayashida; Michael J. Mazza; Stephen M. Westport

[57] ABSTRACT

This invention relates to an clay-based animal litter to which has been applied a liquid carrier containing a boron-containing compound in an odor-controlling effective amount. The boron-containing compound acts by antimicrobial action, controlling urease, or a combination of these mechanisms when the litter is used by the animal.

20 Claims, 1 Drawing Sheet

BORON-BASED ODOR CONTROL ANIMAL LITTER

BACKGROUND OF THE INVENTION

1. Field of the Invention

This invention relates to an animal litter to which has been applied an odor-inhibiting agent which is believed to act by antimicrobial action, acidity, controlling urease, or a combination of these mechanisms to control odor after the litter is used by the animal. The preferred odor control animal litter is a clay-based, particulate substrate to which has been applied a liquid carrier containing a boron-containing material at a critical level of at least 0.06% equivalent boron.

2. Brief Description of the Prior Art

Because of the growing number of domestic animals used as house pets, there is a need for litters so that animals may micturate, void or otherwise eliminate liquid or solid waste indoors in a controlled location However, inevitably, waste build-up leads to malodor production.

As one solution to this problem, Eichenauer, U.S. Pat. No. 4,628,863 suggests a disposable cat litter box which is easily collapsible and can be disposed of in a very compact form. However, this approach, intended for consumer convenience, does not overcome the problem of malodor production.

Kuceski et al, U.S. Pat. No. 3,059,615, Sawyer et al, U.S. Pat. No. 3,029,783, Currey, U.S. Pat No. 4,306,516 and Wortham, U.S. Pat. No. 3,892,846, all suggest the use of fairly strong inorganic or organic acids to treat litters in an effort to control ammonia formation in litters. In each instance, it appears that these acids are essentially used to neutralize ammonia to form an odorless salt, e.g., sulfuric acid combining with ammonia to produce ammonium sulfate.

Still others have sought to decrease odors in litters by improving the absorption rate of the litter itself. E.g., Fry et al, U.S. Pat. No. 3,923,005. Yet another attempt to overcome the problem of odor formation is Colborn et al, U.S. Pat. No. 4,407,231, which, unlike other prior art attempts which merely used a superficial treatment of fragrance, teaches pressure-sensitive encapsulated fragrance particles which frangibilize with the weight of the animal.

Also, two references disclose deodorization of sewage by direct, topical application of, respectively, a trichloroisocyanuric acid (Gould, U.S. Pat. No. 4,054,518) and alkylbenzene sulfonic acid (Ohtsuka, Japan Pat. No. 75-05,538), in both of which cases boric acid is included as a additive in relatively small amounts. Gould apparently uses boric acid as a dispersing agent for the trichloroisocyanuric acid. Ohtsuka, on the other hand, uses the alkylbenzene-sulfonic acid for its emulsifying and foaming properties. Also, Clark et al, U.S. Pat. No. 3,352,792, discloses a deodorant for animal litter containing a dry mixture of magnesium carbonate and borax.

Further, Christianson, U.S. Pat. No. 4,263,873, discloses cellulose pellets impregnated with a pheromone to induce animals to micturate or void in the litter which has a preferred pH of 4-4.5. Christianson further suggests, but does not exemplify, the use of boric acid or borax as odor control materials.

However, none of the foregoing art teaches, discloses or suggests the use of a clay-based litter which has been treated with a urease inhibition/odor control agent comprising a liquid carrier containing a boron-based material at a critical equivalent boron level of at least 0.06%.

SUMMARY OF THE INVENTION

The invention provides an odor control animal litter comprising, comminuted clay particles as an absorbent litter substrate, said particles being contacted with a liquid carrier containing an odor-controlling-effective amount of a boron-based material at a critical equivalent boron level of at least 0.06%.

The odor control animal litter can further include adjuncts selected from dyes, further (and different) antimicrobial agents, deodorants, fragrances, pigments, dedusting compounds, and mixtures thereof. It has further been surprisingly found that to maximize active boron content of the boron - containing material, that sodium hydroxide solution can act as the carrier material to deliver preferred quantities of the boron-based material into the clay litter substrate.

DETAILED DESCRIPTION OF THE PREFERRED EMBODIMENTS

Figure 1:
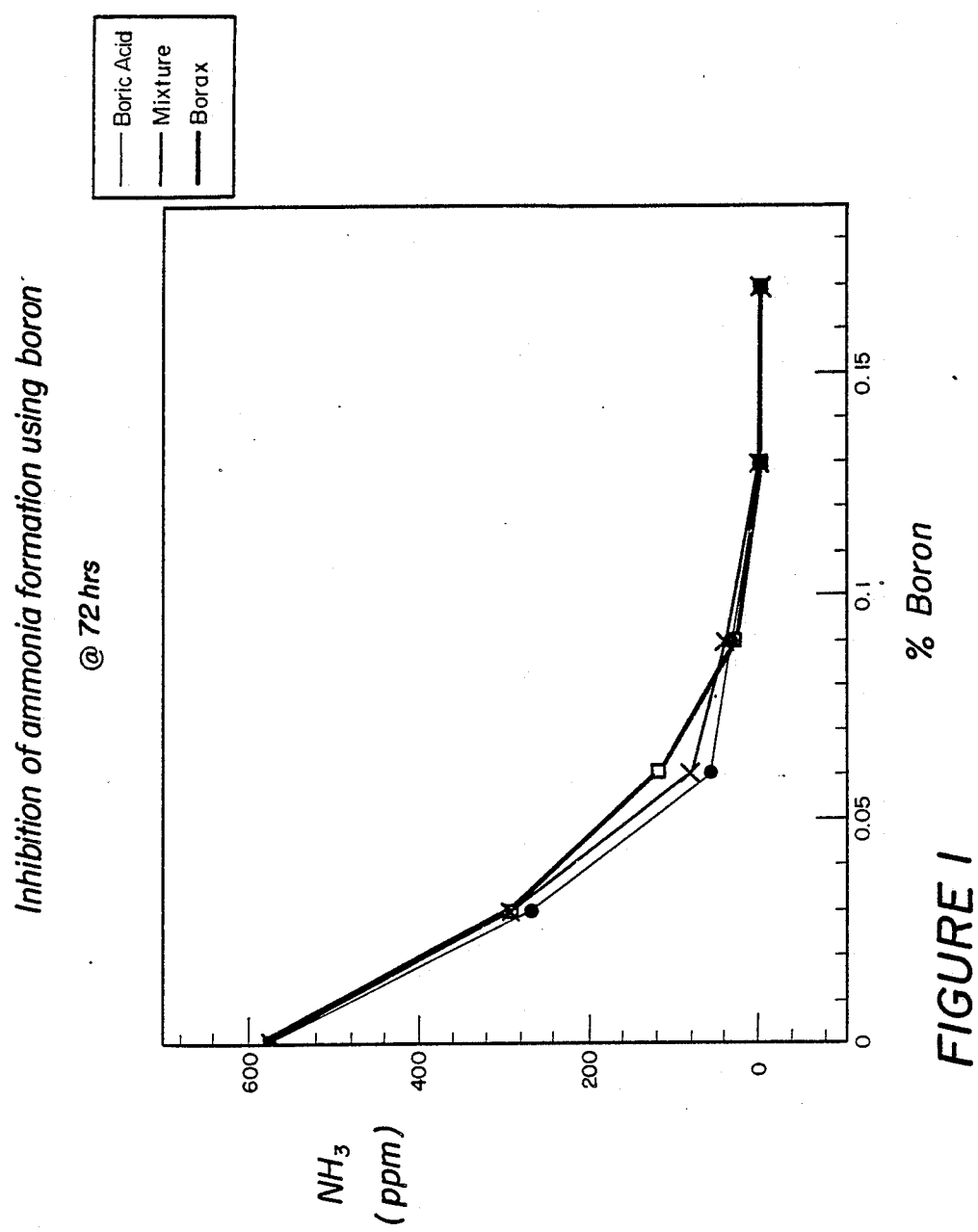
FIG. 1 is a graphical depiction of the critical level of wt. % equivalent boron plotted against $NH_3$ inhibition.

The present invention provides an odor control animal litter in which ammonia formation due to decomposition of urea present in animal waste may be affected by one or more of three mechanisms: (1) pH Control. Since ammonia is a basic material, one would expect that maintaining a low pH will result in the formation of salts of ammonia, which are generally odorless. However, in this invention, it has surprisingly been found that pH is a relatively unimportant factor in controlling odor formation. (2) Urease Inhibition. Urease is an enzyme which is produced by many bacteria and other microflora. Urease acts as a catalyst to break down urea into ammonia via the following chemical pathway

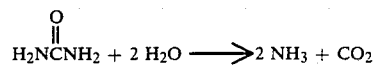

$$H_2N\overset{\overset{O}{\|}}{C}NH_2 + 2\ H_2O \longrightarrow 2\ NH_3 + CO_2$$

Control of urease, via competition, denaturation, or enzyme poisoning, would therefore significantly reduce the formation of ammonia. (3) Bacterial Inhibition. As previously discussed, bacteria and other microflora appear to be sources for urease. Thus, reduction of bacteria through antimicrobial action of the odor control agents would also significantly control odor formation.

It has been surprisingly discovered that a dramatic reduction in odor formation in used litter can occur if the comminuted clay particles used as the litter base are first contacted with a liquid carrier containing an odor-controlling-effective amount of a boron-based material at a critical active boron level.

1. Boron-Based Odor Control Agent:

Most preferred amongst the odor control animal litter additives is boric acid. See, Kirk Othmer, *Enyclopedia Chemical Technology*, 3rd Ed., Vol. 4, pp. 71–77 (1978), incorporated herein by reference. Boric acid has the structure $H_3BO_3$. Boric acid appears to provide multiple benefits in odor control by: (1) acting as a urease inhibitor, which controls odors by preventing enzymatic breakdown of urea; (2) apparently having bacteriostatic properties, which appear to help control odor by controlling the growth of bacteria which are responsible for production of the urease enzymes; and (3) possibly, lowering the pH of the litter thereby neutralizing basic material such as ammonia and amines of animal waste products; However, as previously cautioned, applicants have surprisingly found that in this particular invention, the role of acidity is surprisingly unimportant.

Borax ($Na_2B_4O_7 \times 10H_2O$) is another suitable compound for use in the invention. Other boron-based compounds potentially suitable for use are disclosed in Kirk-Othmer, supra. pp. 67-109, said pages being incorporated herein by reference. In fact, as further discussed below, it appears that the active boron material in the preferred embodiment of this invention is actually a mixture of polyborate species, which is formed in situ in a liquid carrier; or it could be separately manufactured, dried, and used. Combinations of boric acid and borax, or other boron-based compounds, are also included in the invention.

A reference, J. M. Brenner and R. L. Mulvaney, "Urease Activities in Soils," in: *Soil Enzymes* (R. G. Burns, Ed.), p. 181 (1978), discloses that various compounds can act as inhibitors of urea hydrolysis in soils. This urea hydrolysis occurs because of the presence of urease-producing microorganisms. However, the reference does not disclose, teach or suggest that compounds used as urease inhibitors in soils, e.g., by application to fertilizers, would be useful in animal litters. For instance, one reference mentioned, Sor et al, U.S. Pat. No. 3,565,599, discloses that urea fertilizers are coated with a combination of a boron compound and a hydrophobic chemical. It is apparent that the hydrophobic chemical is there to present a barrier to reaction in a moist environment. This can be seen by reviewing Example 8-Table XII, Column 9, Lines 35-52 of the patent.

Another reference, Geissler et al, U.S. Pat. No. 3,523,018 discloses the use of borax as a urease inhibitor in a melt of urea and borax, which must be prilled or pelletized. Finally, Van der Puy et al, U.S. Pat. No. 4,462,819 discloses the use of an organo-boron acid compound as a urease inhibitor for a fertilizer. Again, none of these references teach, disclose or suggest the use of a liquid carrier containing boric acid as an odor control additive for a clay-based animal litter.

Lastly, Christianson, U.S. Pat. No. 4,263,873, discloses cellulose pellets impregnated with a pheromone to induce animals to micturate or void in the litter which has a preferred pH of 4-4.5. Christianson further suggests, but does not exemplify, the use of a boric acid/borax mixture as odor control materials. Most importantly, Christianson neither teaches, discloses or suggests that there is a critical level of at least 0.06% or greater equivalent boron necessary for proper odor control on a clay substrate; that a clay substrate is surprisingly superior to cellulose; and that certain liquid carriers are surprisingly effective at delivering effective amounts of boron compounds onto the clay substrate.

An odor controlling effective amount is defined as at least about 0.06% equivalent boron, more preferably at least greater than 0.06%. The preferred range varies from about 0.06 to about 50%, by weight of the composition. It is more specially preferred that 0.1 to 25%, and most preferably, about 0.1 to 10%, by weight of the composition be used. Assuming the critical level is attained, those skilled in the art will adjust the compositional levels to ensure effective odor control and cost effectiveness.

In the following discussion, equivalent boron is defined as the amount of atomic boron delivered in wt. %. Equivalent boron is determined by calculating the amount of atomic boron in a boron-containing compound, and comparing it to another boron containing compound. E.g., assuming 1 g boric acid and 1 g borax, equivalent boron is:

$$1 \text{ g boric acid}^1 \frac{(10.81 \text{ g } B^2)}{61.84 \text{ g boric acid}} = 0.1748 \text{ g equiv. boron}$$

$$1 \text{ g borax}^3 \frac{(43.24 \text{ g } B^2)}{381.37 \text{ g borax}} = 0.1134 \text{ g equiv. boron}$$

$$\frac{0.1134}{0.1748} \times 100\% = 64.87\%$$

[1] Molecular weight of boric acid ($H_3BO_3$) is 61.84.
[2] Atomic weight of boron is 10.81. In boric acid, there is only one atom of boron; in borax, there are four.
[3] Molecular weight of borax ($Na_2B_4O_7 \times 10H_2O$) is 381.37.

Thus, borax has 64.87% of the amount of equivalent boron compared to 1 g boric acid. The boron-containing materials are powdered or comminuted solids, and are combined with a liquid carrier such as water or water and a solvent, emulsifier or a hydrotrope, if neccessary. It is most preferred to add the additive via liquid carrier to evenly distribute the additive to the litter material. As discussed below, in sections 4 and 5, the most preferred manner of addition is to use a sodium hydroxide solution as a carrier.

2. Litter materials:

A wide variety of materials can be used for litters. For example, porous clays are readily adaptable for use as the absorbent substrates needed for litters. Their ability to absorb or adsorb moisture makes them excellent candidates for litters. Most importantly, in the invention, clays demonstrate superior odor control properties when dosed with boron-containing compounds. Suitable litters include Georgia White clay, bentonite, montmorillonite, fossilized plant materials, expanded perlites, zeolites, gypsum and other equivalent materials known to those skilled in the art. Paper or other cellulose based materials are not preferred. The clay particles are comminuted. That is, they are pelletized or formed into particles which have a size varying from 50 to 5600 microns, although such particle size does not appear critical to the practice of the invention. A particularly preferred litter is the litter containing a microencapsulated fragrance described in Colborn et al, U.S. Pat. No. 4,407,231, incorporated herein by reference.

3. Adjunct materials:

Suitable adjuncts can be added to the litters of this invention. For instance, there are dyes and pigments such as suitably treated titanium dioxide; additional and different germicides such as quaternary ammonium compounds, and certain 3-isothiazolones (sold under the trademark KATHON ®); chemical deodorants, such as sodium bicarbonate, which differ from the boron-based compounds of the invention; fragrances (such as those available from such commercial vendors as International Flavours and Fragrances, Inc. and Givaudan), which fragrances can additionally be uncoated (e.g., fragrance blends) or encapsulated (as in U.S. Pat. No. 4,407,231); dedusting compounds or agents, such as water-soluble polymeric resins, e.g., polyvinyl alcohol, polyvinyl pyrrolidone, polyacrylic acid, xanthan gum, gum arabic, other natural resins, and mixtures of any of these resins.

4. Processing Materials:

It has been further surprisingly found that in order to maximize the amount of equivalent boron which can be applied to the litter substrate, sodium hydroxide (NaOH) in aqueous solution is used as a carrier material. It is possible that other alkali metal hydroxides may function in an equivalent fashion.

In the invention, the range of sodium hydroxide solution can vary from a range of 1.0 to 20.0 wt. %, and it is preferred that it be present in certain weight ratios with respect to boric acid. Preferably, boric acid:NaOH ratio is less than about 10:1, more preferably less than about 7:1, and is most preferably around 5:1.

It is not exactly understood why a boric acid/NaOH solution attains such efficient results, but, without being bound by any particular theory, it appears that boric acid and other sources of equivalent boron, have rather limited solubility in water. Thus, simply dosing dry, finely divided boric acid is not as effective as using NaOH solution as a carrier. The carrier solution apparently has an added enhancement of causing the boric acid to be more adsorbent/absorbent to the clay litter surface. Thus, to a certain extent, NaOH is acting as a dispersing aid for the boric acid by transforming the boric acid into polyborate species. It therefore appears that polyborates are effective odor control agents in and of themselves. This is so whether it is formed in situ by combining boric acid and NaOH in aqueous solution and dosing a given litter; but also where the polyborate is first formed by a given reaction, likely in aqueous media, dried into crystals or the like, and used. A further discussion of this system follows in section 5 below.

5. Coated Litter Embodiment:

In a preferred embodiment of this invention, the litter is coated via fluid spraying process with numerous materials, including the boron-based odor control actives.

It is most desirable to combine various materials, such as a fragrance, and contact the same to the clay litters of this invention. Microencapsulated fragrances provide a means of aesthetically fragrancing and masking odors. The microcapsules accomplish this by fracturing when the animal steps on the litter and stresses the microcapsules until they rupture, releasing the fragrance. Similarly, by having the boron-containing odor control compounds of this invention in close association with the litter particles, one avoids underdosing some particles, and having excess odor control agent on others, thus underutilizing the agent.

Thus, in a preferred embodiment, the boron-containing materials of this invention are processed in a solution containing alkali metal hydroxide, and then combined with a separate slurry containing other actives, most desirably, at least one further additive selected from dyes, pigments, fragrances (most preferably, encapsulated fragrance), further odor control/antimicrobial agents, chemical deodorants, emulsifiers, thickeners and adhesive agents. Xanthan gum is preferred herein, since it appears to perform many functions, such as suspending, thickening and adhering.

Further, the boric acid/NaOH solution and the slurry containing the actives need not be kept in separate batches, and in fact, may preferably be combined so as advantageously to allow either batch or continuous processing.

It was found that the somewhat limited solubility of boric acid in water could be dramatically improved by the use of alkali metal hydroxide, most preferably, sodium hydroxide, in solution. Attempts at using other emulsifiers/dispersing aids failed, whether acidic, surfactants, or the like. It was further discovered that heating the NaOH solution may improve the solubility of the boric acid. Even more surprising was the discovery that the high amount of alkalinity in the system did not impair the odor controlling properties of the boric acid. Literature (e.g., Christianson, U.S. Pat. No. 4,263,873) appeared to teach that maintaining low pH was necessary to effect proper odor control. However, the present invention demonstrates that if the critical boron level is attained, pH is a relatively minor consideration in odor control. Again, formation of polyborate may be a key to this improvement in performance. Further explanation of this embodiment of the invention may be found by reference to the Experimental section.

In the Experimental section that follows, three aspects of the invention were explored: (1) critical equivalent boron concentration was determined; (2) a comparison was conducted between the prior art and the invention; and (3) a preferred embodiment, in which the clay litter particles were coated with both boric acid odor control agent and various other actives, was demonstrated.

I. CRITICAL BORON LEVEL DETERMINATION

In the following experiments, a critical boron level was determined in the invention. The experiments showed that at at least 0.06% equivalent boron, and most demonstrably at 0.1% equivalent boron, substantially little or no ammonia formation was noted.

The following procedure was used: Georgia-White clay (Oil-Dri Corporation of America) was chute-split into samples containing 50 g±2.5 clay. Chute-splitting insures uniform particle size of the clay. These chute-split samples were placed in 8 oz. jars. Each sample was then dosed with dry powder boric acid, borax, and a 50/50 wt./wt. mixture of borax/boric acid. The jars were capped, rolled and shaken to insure uniform distribution over the surface of the clay.

To each jar was added 50 mL (53.2 g) of cat urine, with stirring, to ensure uniform dosage. After dosing, the jars were uncapped and set out open in a laboratory hood (room temperature: 70° F. (21° C.)) until an ammoniacal odor developed.

Ammonia levels were then determined using a Kitegawa Toxic Gas Detector loaded with Matheson ammonia detector tubes. First, the jars were cautiously handled so as to prevent disturbing any gases formed in the headspaces. The jars were capped (the caps were first perforated with a small aperture to allow access to the ammonia tube) and then the ammonia tubes were inserted. The Kitegawa Detector then drew 100 mL air samples into the tubes and ammonia levels were read by viewing color changes in the tubes and comparing against a scale. In the samples, the levels were reported as the average of 4 replicates, in Table I below. This is also graphically depicted in FIG. 1. The pH of the litters is reported in Table II below.

TABLE I

| | Ammonia data[1] | | |
| --- | --- | --- | --- |
| | Source and Ammonia Reading (ppm NH$_3$) | | |
| Wt. % Equiv. Boron | Boric Acid | 50/50 Mixture | Borax |
| 0.00 | 575 ± 38 | 575 ± 38 | 575 ± 38 |
| 0.03 | 267 ± 25 | 292 ± 42 | 287 ± 15 |
| 0.06 | 57 ± 15 | 78 ± 13 | 117 ± 15 |

TABLE I-continued

| | Ammonia data[1] | | |
|---|---|---|---|
| | Source and Ammonia Reading (ppm NH$_3$) | | |
| Wt. % Equiv. Boron | Boric Acid | 50/50 Mixture | Borax |
| 0.09 | 32 ± 17 | 37 ± 20 | 30 ± 6 |
| 0.13 | 0 | 0 | 0 |
| 0.17 | 0 | 0 | 0 |

[1] Ammonia readings taken 72 hours after dosing.

TABLE II

| | pH Data | | |
|---|---|---|---|
| | Source and pH Value | | |
| Wt. % Equiv. Boron | Boric Acid | 50/50 Mixture | Borax |
| 0.00 | 6.23 | 6.23 | 6.23 |
| 0.03 | 6.17 | 6.50 | 7.81 |
| 0.06 | 6.22 | 7.48 | 8.33 |
| 0.09 | 6.15 | 7.70 | 8.55 |
| 0.13 | 6.19 | 7.95 | 8.76 |
| 0.17 | 6.11 | 7.98 | 8.80 |

II. COMPARATIVE EXPERIMENTATION VERSUS PRIOR ART

In Christianson, U.S. Pat. No. 4,263,873, it is contended that a boric acid/borax mixture could be added as an odor control additive to a cellulose litter/pheromone combination. Applicants compared the cellulose based litter of Christianson versus their preferred clay-based litter and found that their invention surprisingly demonstrated dramatically superior odor controlling performance.

In these experiments, the following procedures were followed:

1. Sample Preparation:

Since Christianson teaches a paper based litter which may be treated with a borax/boric acid mixture, a direct comparison against the inventive clay litter was conducted. Additionally, the Christianson paper litter was directly compared to the clay litters of the invention using a preferred boric acid/NaOH solution.

a. Cellulose Litter Samples:

100 mL of paper substrate was used to provide the same volume of litter as in the clay-based samples. The cellulose samples were Nos. 1, 2 and 4. Since the density of paper is about 0.38 g/mL, 38 g of paper was used. These were loaded in jars. To obtain the proper pH, as prescribed by Christianson's teachings, 1 g of NaHSO$_4$ buffer, added as a solid, was used, as to attempt to obtain a pH of 2 (No. 1) and 0.30 g of NaHSO$_4$ was added to attempt to obtain a pH of 5.5 (No. 2). To obtain proper dosage, an eye dropper was used to dose a sufficient quantity of a 7% boric acid/borax mixture to obtain a 0.0435 g weight equivalent boron content. In the invention, a boric acid/NaOH mixture is a preferred embodiment, so a 30% solution of boric acid/NaOH was added in a sufficient quantity to obtain a 0.0435 g weight equivalent boron content to No. 4 as a further comparison against the invention.

b. Clay Samples:

In order to provide examples of the invention's teachings, Georgia-White clay was chute-split into 50 g±2 samples to provide a volume equal to the paper (namely, 100 mL by volume of clay) and loaded in 8 oz. jars to insure homogeneity and reproducible results. As a direct comparison against Christianson, 7% boric acid/borax solution was dropped onto one clay substrate using an eye dropper in a sufficient quantity to obtain a 0.0435 g weight equivalent boron content (No. 3). As an example of the invention, a 30% boric acid solution with NaOH was similarly added to another sample in a sufficient quantity to obtain a 0.0435 g weight equivalent boron content (No. 5).

2. Sample dosing:

Each sample was dosed with 50 mL of cat urine. Each sample was stirred to ensure homogeneity. The jars were allowed to sit open under a fume hood until an ammoniacal odor developed. At that time, ammonia readings were taken using the Kitegawa Gas Detector loaded with ammonia tubes, under the protocol described previously. 5 replicates were taken of each sample and averaged. The following results were obtained:

TABLE III

| | | Starting pH of Samples[1] | | |
|---|---|---|---|---|
| Example | Odor Control Agent | Wt. Equiv. Boron | pH | NaHSO$_4$ added |
| 1 (Paper) | Boric Acid/Borax | 0.0435 g[2] | 2.65 | 1.0 |
| 2 (Paper) | Boric Acid/Borax | 0.0435 g[2] | 5.45 | 0.3 |
| 3 (Clay) | Boric Acid/Borax | 0.0435 g[3] | 3.91 | — |
| 4 (Paper) | Boric Acid/NaOH | 0.0435 g[2] | 8.54 | — |
| 5 (Clay) | Boric Acid/NaOH | 0.0435 g[3] | 7.91 | — |

[1] pH of the cat urine was 6.70
[2] = 0.115 wt. % equiv. boron
[3] = 0.09 wt. % equiv. boron

TABLE IV

| | | Ammonia Readings (ppm)[1] | | |
|---|---|---|---|---|
| Example | Odor Control Agent | Wt. Equiv. Boron | Time: 68 hrs. | Time:[2] 168 hrs. |
| 1 (Paper) | Boric Acid/Borax | 0.0435 g[3] | 0 | 72 |
| 2 (Paper) | Boric Acid/Borax | 0.0435 g[3] | 7 | 220 |
| 3 (Clay) | Boric Acid/Borax | 0.0435 g[4] | 0 | 0 |
| 4 (Paper) | Boric Acid/NaOH | 0.0435 g[3] | 64 | 268 |
| 5 (Clay) | Boric Acid/NaOH | 0.0435 g[4] | 0 | 2 |

[1] Hood temperature was 74° F. (23.3° C.)
[2] LSD (95% confidence level = 30
[3] = 0.115 wt. % equiv. boron
[4] = 0.09 wt. % equiv. boron The foregoing results in Table IV demonstrate that the clay litters dosed with boron-based odor control compounds of the invention are superior to the cellulose based litters of the Christianson patent. This superiority was especially unexpected given that Christianson advocates a critically low pH (around 4–4.5). One can compare the performances of Eg. 3 (invention) versus Egs. 1 and 2 (Christianson), and of Eg. 5 (invention) versus Eg. 4 (Christianson) and see that the invention's performance superiority is dramatically unexpected. Moreover, the performance of applicants' invention shows that pH is apparently not a critical factor, contrary to Christianson's teachings.

III. COATED LITTER PARTICLES

1. Boric Acid Processing:

As discussed in Sections 4 and 5 above, it was found that the limited solubility of boric acid in water could be markedly improved by using sodium hydroxide as a processing aid. In conducting these experiments, it was determined that a discrete amount of NaOH was necessary to put a given quantity of boric acid into solution.

a. 14.2% Boric Acid

| | |
|---|---|
| 180 g H$_2$O | % boric acid = 14.2% |
| 20 g NaOH | % NaOH = 8.6% |

-continued

|   | | | |
|---|---|---|---|
| | 33 g H$_3$BO$_3$ (solubilized) | pH = | 11.33 |
| | 233 g | | |
| b. | 14.67% Boric Acid | | |
| | 170 g H$_2$O | % boric acid = | 14.67% |
| | 4.05 g NaOH | % NaOH = | 1.98% |
| | 30 g H$_3$BO$_3$ | pH = | 7.06 |
| | 204.05 g | | |
| c. | 20% Boric Acid | | |
| | 160 g H$_2$ | % boric acid = | 19.44% |
| | 5.79 g NaOH | % NaOH = | 2.81% |
| | 40 g H$_3$BO$_3$ | pH | 6.97 |
| | 205.79 g | | |
| d. | 34% Boric Acid (reduced scale) | | |
| | 6% NaOH | | |
| | 34% H$_3$BO$_3$ | | |
| | 50% H$_2$O | | |
| | 100% | | |

In d, the listed materials were mixed with a stir bar in a 600 ml beaker. As a result of the exothermic reaction, the temperature of solution rose to 36° C. Final pH=7.46. This experiment was successful in attaining a clear solution. A further example using only 5% NaOH was less successful.

e. Maximum Boric Acid Solution:

In this example, an attempt was made to correlate temperature (heating) and NaOH level to maximize the amount of boric acid solubilized. The results are disclosed in TABLE V:

TABLE V

| | SOLUTION PERCENTAGES | | | | |
|---|---|---|---|---|---|
| EX-AMPLE | % Boric Acid | % NaOH | % H$_2$O | TEMP. | OBSERVATION |
| 1. | 50 | 5 | 45 | 60° C. | Not Soluble |
| 2. | 30 | 5 | 65 | " | Soluble |
| 3. | 33.3 | 4.8 | 61.9 | " | " |
| 4. | 35.6 | 6.7 | 57.7 | " | " |
| 5. | 38.3 | 6.4 | 55.3 | " | " |
| 6. | 40.8 | 6.1 | 53.1 | " | Did Not completely clear |
| 7. | 39.2 | 5.9 | 54.9 | " | Did Not completely clear |
| 8. | 37.7 | 5.7 | 65.6 | " | Did Not completely clear |
| 9. | 37.3 | 6.7 | 56.0 | " | Clear-Soluble |
| 10. | 38.5 | 6.6 | 54.9 | " | " |

2. Coating Formulation and Process:

A process was developed for combining a boron odor control agent and an encapsulated fragrance (as described in U.S. Pat. No. 4,407,231), surprisingly, unlike the method of U.S. Pat. No. 4,407,231, applicants discovered that separate polymeric suspending and adhesive agents were not required in their invention. Instead, the boric acid/NaOH solution appears to combine well with a single polymeric agent with both suspending and adhesive properties. A most preferred polymeric agent is xanthan gum. This embodiment was executed as follows:

1. Xanthan Gum Formula Preparation:

Two solutions are prepared:

(1) Boric Acid (NaOH solution) and
(2) Colorant, encapsulated fragrance in slurry with xanthan gum as a thickener/adhesive.

a. Boric Acid
50-75% H$_2$O
1-20% NaOH (Beads)
1-40% Boric Acid b. Dye/Encapsulate Slurry
80-99% H$_2$O
0.005-1% Dye
0.05-1% Xanthan Gum
1-20% Encapsulated Fragrance Solution a is combined with slurry b in a weight ratio of 7:3 to 4:6 a:b. This forms a combined slurry. This combined slurry was sprayed on a clay (Georgia-White clay) bed at a level of 2.83% in the final formula. This process is not confined to this order of addition. For example, separate additions of each solution can be effected. Also, the additives, especially fragrance, dye and thickener could be added in the first solution. As previously mentioned, the process could be carried out in either batchwise or continuous fashion.

While the foregoing formulations depict various embodiments of the invention, such examples are non-limiting and do not restrict the scope and content of the claimed invention. The invention is further illustrated by reference to the claims which follow hereto.

We claim:

1. An odor control animal litter comprising: particles of an absorbent clay substrate, said particles being contacted with a liquid carrier containing an odor-controlling-effective amount of a boron - containing material having an equivalent boron level of a least 0.06%, said material comprising boric acid present in an amount of from 0.06% to about 50% by weight and said liquid carrier comprising an alkali metal hydroxide in solution.

2. The odor control animal litter of claim 1 wherein the absorbent substrate is a clay selected from the group consisting of Georgia White clay, bentonite, montmorillonite, expanded perlites, zeolites and gypsum.

3. The odor control animal litter of claim 1 wherein said alkali metal hydroxide is sodium hydroxide.

4. The odor control animal litter of claim 3 wherein the amount of sodium hydroxide in solution varies from about 1.0 to 20.0%, in a ratio of less than 10:1 boric acid: sodium hydroxide.

5. The odor control animal litter of claim 1 further comprising an adjunct selected from the group consisting of dyes, further germicides, chemical deodorants, fragrances, pigments, dedusting compounds, adhesives, thickening agents, suspending agents, and mixtures thereof.

6. The odor control animal litter of claim 5 wherein said fragrance is selected from the group consisting of non-coated and encapsulated fragrances.

7. The odor control animal litter of claim 6 further comprising a suspending and adhesive agent.

8. The odor control animal litter of claim 7 wherein said suspending and adhesive agent is a natural resin.

9. The odor control animal litter of claim 8 wherein said natural resin is xanthan gum.

10. A method of controlling odor formation in animal litter when said litters are used by animals, comprising applying to particles of an absorbent litter substrate a liquid carrier containing an odor-controlling-effective amount of a boron containing material having an equal boron level of at least about 0.06%, said material comprising boric acid and said liquid carrier comprising an alkali metal hydroxide in solution.

11. The method of claim 10 wherein said alkali metal hydroxide is sodium hydroxide.

12. The method of claim 11 wherein the amount of sodium hydroxide in solution varies from about 1.0 to 20.0%, in a ratio of boric acid: sodium hydroxide of less than 10:1.

13. The method of claim 12 further comprising the step of adding an adjunct selected from the group consisting of dyes, further germicides, chemical deodorants, fragrances, pigments, dedusting compounds, adhesives, thickening agents, suspending agents and mixtures thereof.

14. The method of claim 13 further comprising adding a suspending and adhesive agent.

15. The method of claim 14 wherein said suspending and adhesive agent is a natural resin.

16. The method of claim 15 wherein said natural resin is xanthan gum.

17. The method claim 10 carried out as a batch process.

18. The method of claim 10 carried out as a continuous process.

19. An odor control animal litter substantially free of cellulose materials comprising:
 (a) a portion of clay particles having a particle size range from 50 to 5600 microns; and
 (b) a liquid carrier containing a boron-based odor control agent intimately contacting said clay particles, said agent being boric acid present at a level of at least 0.06% equivalent boron, said liquid carrier being alkali metal hydroxide in solution which is substantially adsorbed/absorbed by said particles of (a).

20. The odor control animal litter of claim 19 wherein said agent is evenly distributed throughout the litter.

* * * * *